(12) United States Patent
Ogawa

(10) Patent No.: US 9,973,051 B2
(45) Date of Patent: May 15, 2018

(54) METHOD FOR CONNECTING MOTOR WIRE

(71) Applicant: Panasonic Intellectual Property Management Co., Ltd., Osaka (JP)

(72) Inventor: Kuniyuki Ogawa, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 265 days.

(21) Appl. No.: 14/778,608

(22) PCT Filed: Mar. 12, 2014

(86) PCT No.: PCT/JP2014/001401
§ 371 (c)(1),
(2) Date: Sep. 21, 2015

(87) PCT Pub. No.: WO2014/156019
PCT Pub. Date: Oct. 2, 2014

(65) Prior Publication Data
US 2016/0056678 A1 Feb. 25, 2016

(30) Foreign Application Priority Data

Mar. 27, 2013 (JP) .................................. 2013-065857

(51) Int. Cl.
*H04R 1/18* (2006.01)
*H02K 3/28* (2006.01)
(Continued)

(52) U.S. Cl.
CPC ............... *H02K 3/28* (2013.01); *H01R 4/184* (2013.01); *H01R 4/20* (2013.01); *H02K 15/0075* (2013.01); *H01R 4/62* (2013.01)

(58) Field of Classification Search
CPC ...... H01R 4/184; H01R 4/185; H02K 2203/06
(Continued)

(56) References Cited

U.S. PATENT DOCUMENTS 5,984,711 A * 11/1999 Woodard ........... H01R 13/5224
29/257
2009/0108698 A1 * 4/2009 Guan .................... H01R 4/024
310/234

(Continued)

FOREIGN PATENT DOCUMENTS

CN 1734685 A 2/2006
CN 201226379 Y 4/2009
(Continued)

OTHER PUBLICATIONS

International Search Report of PCT application No. PCT/JP2014/001401 dated Jun. 10, 2014.
(Continued)

*Primary Examiner* — Jeremy Luks
(74) *Attorney, Agent, or Firm* — Hamre, Schumann, Mueller & Larson, P.C.

(57) ABSTRACT

According to the method for connecting motor wire of the present invention, wire as a first wire having folding part is connected to lead as a first lead or a second wire, each having connecting part, with connection terminal having crimping part. After folding part is folded one or more times, folding part and connecting part are crimped at crimping part.

7 Claims, 7 Drawing Sheets

(51) Int. Cl.
  *H01R 4/18* (2006.01)
  *H02K 15/00* (2006.01)
  *H01R 4/20* (2006.01)
  *H01R 4/62* (2006.01)

(58) Field of Classification Search
  USPC .......................................................... 310/71
  See application file for complete search history.

(56) References Cited

U.S. PATENT DOCUMENTS

2009/0133927 A1   5/2009  Onuma
2009/0269970 A1* 10/2009  Kumakura ......... H01R 43/0486
                                                                      439/421
2012/0295496 A1  11/2012  Suzuki
2014/0174820 A1   6/2014  Ohnuma

FOREIGN PATENT DOCUMENTS

| JP | 58-044675 | 3/1983 |
| JP | 2-030264 U | 2/1990 |
| JP | 7-176359 | 7/1995 |
| JP | 2009-129812 | 6/2009 |
| JP | 2009-283458 | 12/2009 |
| JP | 2010-146903 | 7/2010 |
| JP | 2011-187400 | 9/2011 |
| JP | 2013-051079 | 3/2013 |

OTHER PUBLICATIONS

English Translation of Chinese Search Report dated May 10, 2017 for the related Chinese Patent Application No. 201480018630.X—2 pages.
English Translation of Chinese Search Report dated Nov. 28, 2017 for the related Chinese Patent Application No. 201480018630.X.

* cited by examiner

METHOD FOR CONNECTING MOTOR WIRE

CROSS-REFERENCE TO RELATED APPLICATIONS

This application is a U.S. national stage application of the PCT International Application No. PCT/JP2014/001401 filed on Mar. 12, 2014, which claims the benefit of foreign priority of Japanese patent application 2013-065857 filed on Mar. 27, 2013, the contents all of which are incorporated herein by reference.

TECHNICAL FIELD

The present invention relates to a method for connecting wires used for a motor with each other or connecting a wire to a lead used for a motor.

BACKGROUND ART

Conventionally, a wire-to-wire connection and a wire-to-lead connection used for a motor are electrically and mechanically established via a connection terminal. In the description below, connecting wires with each other and connecting a wire to a lead may be collectively referred to as connecting wires and the like. As a method for connecting wires and the like, Patent Literatures 1 and 2 suggest a method for crimping a connection terminal. Hereinafter, a connection terminal may be simply referred to as a terminal.

A conventional method for crimping a terminal will be described with reference to FIG. 3 through FIG. 7C.

FIG. 3 is a connecting diagram of a conventional single-phase induction motor. As shown in FIG. 3, main lead 22 is connected to main coil 20, and auxiliary lead 23 is connected to auxiliary coil 21. Common lead 24 is connected to both of main coil 20 and auxiliary coil 21. Commonly, the amount of current flown into auxiliary coil 21 is smaller than that of main coil 20. Accordingly, the wire used for auxiliary coil 21 has a wire diameter smaller than that of main coil 20.

The method of connecting each section is described with reference to FIG. 4A through FIG. 6C.

FIGS. 4A through 4C show a way of the connection of main lead 22 and main coil 20. As shown in FIGS. 4A and 4B, wire 20a forming main coil 20 and core wire 22a of main lead 22 are disposed on the inner side of terminal 25 which is a connection terminal. After wire 20a and core wire 22a are placed inside terminal 25, terminal 25 is bent inwardly. As shown in FIG. 4C, terminal 25 is crimped so as to wrap around wire 20a and core wire 22a. At that time, in crimping part 25a of terminal 25, a distorted area is formed in wire 20a and core wire 22a. When a predetermined amount of distortion is applied to wire 20a and core wire 22a, they are electrically and mechanically connected with each other.

FIGS. 5A through 5C show a way of the connection of auxiliary lead 23 and auxiliary coil 21. As shown in FIGS. 5A and 5B, wire 21a of auxiliary coil 21 and core wire 23a of auxiliary lead 23 are disposed on the inner side of terminal 25 which is a connection terminal. FIG. 5C shows a state where auxiliary lead 23 and auxiliary lead 21 are crimped by terminal 25.

FIGS. 6A through 6C show a way of the connection of common lead 24, main coil 20, and auxiliary coil 21. As shown in FIGS. 6A and 6B, wire 20a forming main coil 20, wire 21a forming auxiliary coil 21, and core wire 24a of common lead 24 are disposed on the inner side of connection terminal 25. FIG. 6C shows a state where common lead 24, main coil 20, and auxiliary coil 21 are crimped by terminal 25.

Each wire diameter of the wires and the core wires used for a single-phase induction motor is determined so as to be suitable for the amount of current that each section carries. In connecting wires and the like used for a single-phase induction motor, as shown in FIGS. 4A through 6C, wires 20a and 21a and core wires 22a, 23a and 24a to be crimped at crimping part 25a are different in cross-section area and in number of the wires. Specifically, the connection has three combinations described above.

In the situation above, when terminal 25, which is shown in FIGS. 4A to 4C, for connecting main lead 22 and main coil 20 is used for other connections in the single-phase induction motor. Then the problem below arises. That is, as shown in FIGS. 5A through 5C, terminal 25 is used for crimping auxiliary coil 21 of a small wire diameter. A gap may be happened to be formed at crimping part 25 due to large dimensions of terminal 25. If such a gap is formed at crimping part 25, auxiliary lead 23 and auxiliary coil 21 fail to have a predetermined amount of distortion, resulting in unstable connection between them.

To address the problem, as shown in FIGS. 7A through 7C, auxiliary lead 23 and auxiliary coil 21 are connected by terminal 26 having small dimensions. The dimension of terminal 26 is smaller than that of terminal 25 used for connecting wire 20a of main coil 20.

As described above, by using terminal 26 having smaller dimension than that of terminal 25 which is used for other portions, a predetermined amount of distortion is applied to crimping part 26a. Having the predetermined amount of distortion, core wire 23a and wire 21a are electrically and mechanically connected with each other via terminal 26.

CITATION LIST

Patent Literature

PTL 1: Japanese Patent Application Publication No. 2011-187400
PTL 2: Japanese Patent Application Publication No. 2009-129812

SUMMARY OF THE INVENTION

According to a method for connecting wires used for a motor of the present invention, a first wire having a folding part is connected to a first lead or a second wire, each having a connecting part with a connection terminal having a crimping part.

After the folding part is folded one or more times, the folded folding part and the connecting part are crimped with each other at the crimping part.

DESCRIPTION OF EMBODIMENT

Figure 1A:
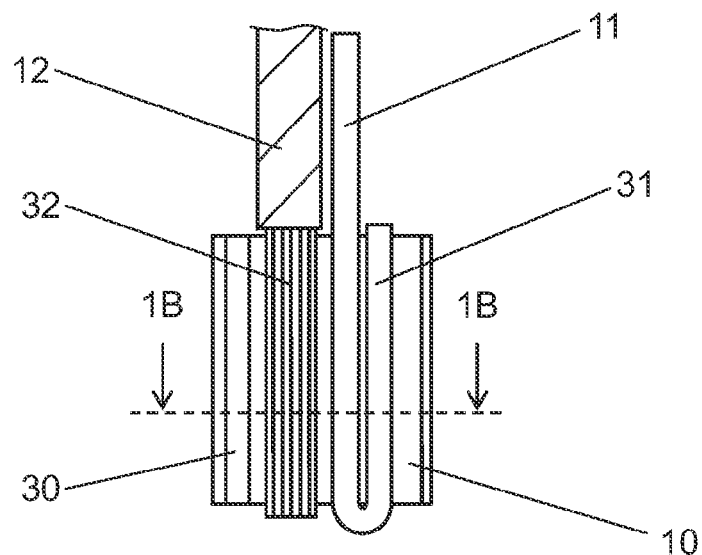
FIG. 1A is a top view illustrating a method for connecting wires used for a motor in accordance with a first exemplary embodiment of the present invention.

According to the method for connecting wires used for a motor, which will be described later, a first wire having a folding part is connected to a first lead or a second wire each having a connecting part, with a connection terminal having a crimping part.

After the folding part is folded one or more times, the folded folding part and the connecting part are crimped with each other at the crimping part.

As described above, the folding part is folded one or more times. This increases the cross-section area of the first wire in the crimping part of the connection terminal. The increase of the cross-section area of the first wire makes larger a cross section area which contributes to appropriate crimping of the folding part and the connecting part at the crimping part of the connection terminal. In other words, this allows the folding part and the connecting part to have a predetermined amount of distortion. As a result, the first wire and the second wire, or the first wire and the first lead are appropriately crimped with each other in an appropriate range of the cross-section area by the connection terminal.

As a result, according to the method for connecting wires for a motor described in the exemplary embodiment of the present invention, a wires having different diameters or a wire and a lead having different diameters are able to be connected with a connection terminal of a single kind of size.

Thus a material cost and investment in facilities are able to be reduced for connecting wires for a motor and the like.

A conventional structure has problems to be improved below.

A required amount of distortion is determined in a wire and the like to be connected. Accordingly, a connection terminal used for crimping has a predetermined range of the cross-section area of the wire and the like for which a connection terminal is suitable. If a wire to be connected has a cross-section area being out of the range determined, the terminal is replaced with another terminal having another terminal which is suitable for the wires and the like to be connected.

Besides, a crimping machine dedicated to each size of the terminals is used for respective one of the connection terminals. When a plurality of connection terminals having different dimensions are used, the crimping machines suitable for respective sizes of the connection terminals are required to be prepared. This has produced the problem of increase in investment in facilities.

In particular, according to the aforementioned single-phase induction motor, the wires and the like to be crimped at respective connecting part have difference in the cross-section area and in the number of the wires. Specifically, the structure of the motor above has three combinations with respect to the connections. Thus, in order to produce a single motor, a plurality of connection terminals having different dimensions are used depending on the wires and the like to be crimped. That is, a plurality of connection terminals is used, so that it causes a problem on increasing labor and effort for management.

If a motor is produced by use of a connection terminal of a single kind of size in consideration of the problems above, the following problem arises. That is, the wires and the like are selected so as to be in a range with which the connection terminal can apply appropriate crimping.

That is, in order to conform to the specifications of the crimping part of the connection terminal, a wire having unnecessarily large diameter is employed even for a wire that carries a small amount of current according to a performance of the motor. In other words, the wires and the like are selected based on the range with which the crimping part of the connection terminal applies appropriate crimping, not based on the magnitude of current that the wires and the like carry. This has brought an excessive increase in quality, and accordingly, unnecessary increase in material cost of the wires and the like.

Hereinafter, an exemplary embodiment of the present invention will be described with reference to accompanying drawings. It is to be understood that the exemplary embodiment below is an example for purposes of illustration only and is not to be limiting of the scope of the invention.

First Exemplary Embodiment

Figure 1B:
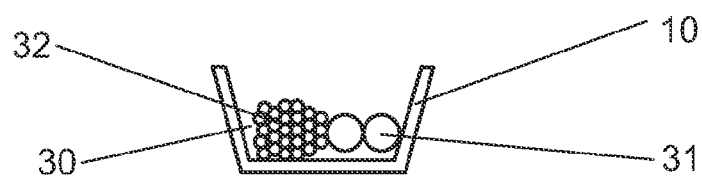
FIG. 1B is a cross-section view taken along the line 1B-1B of FIG. 1A.
Figure 1C:
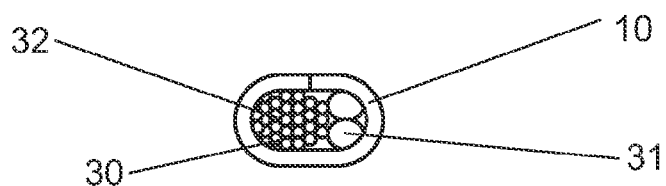
FIG. 1C is a cross-section view showing a state changed from that shown in FIG. 1B.
Figure 2A:
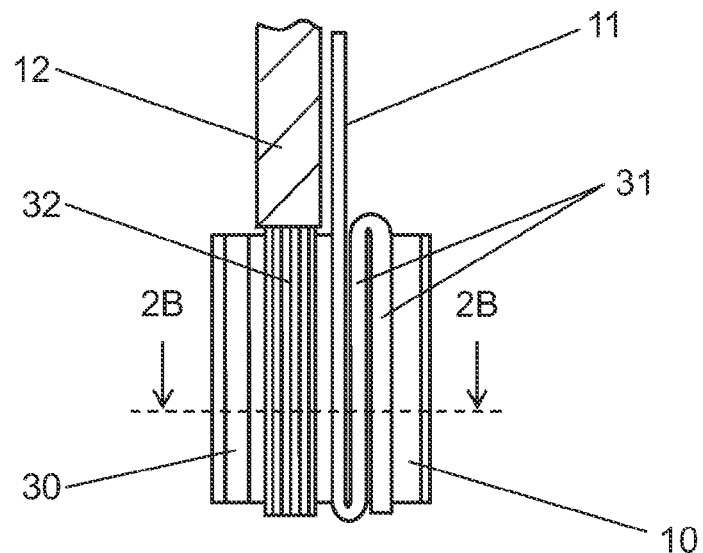
FIG. 2A is a top view illustrating a method for connecting wires used for a motor in accordance with a first exemplary embodiment of the present invention.
Figure 2B:
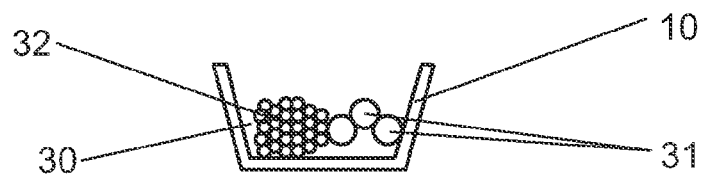
FIG. 2B is a cross-section view taken along the line 2B-2B of FIG. 2A.
Figure 2C:
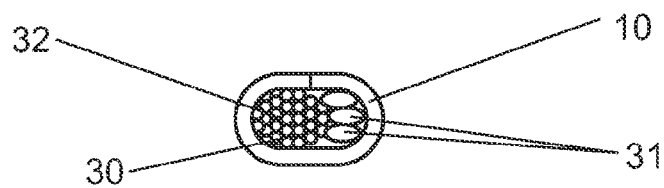
FIG. 2C is a cross-section view showing a state changed from that shown in FIG. 2B.
Figure 3:
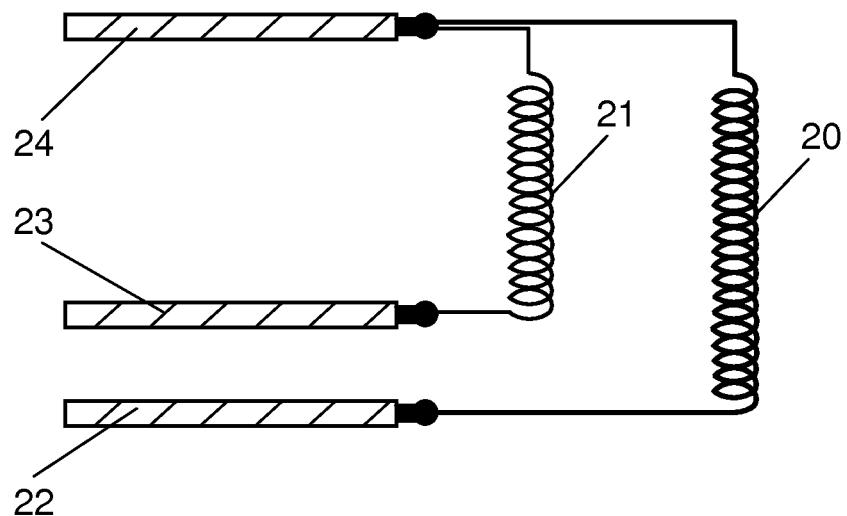
FIG. 3 is a connecting diagram of a conventional single-phase induction motor.
Figure 4A:
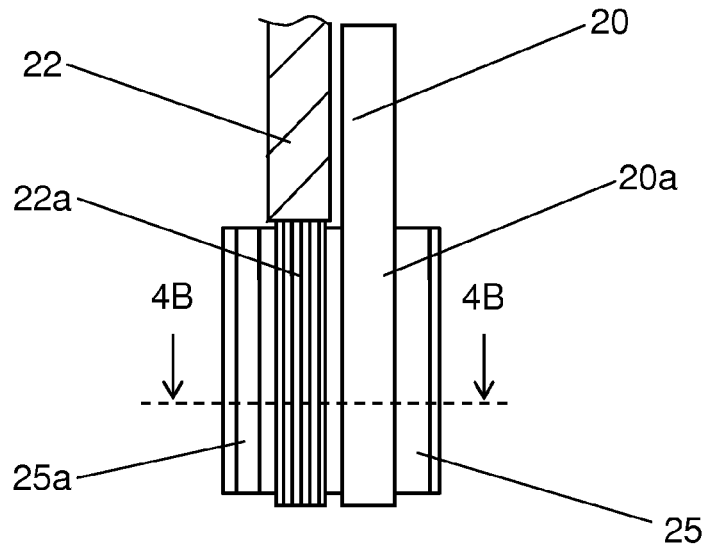
FIG. 4A is a top view illustrating a method for connecting wires of a main coil of a conventional single-phase induction motor.
Figure 4B:
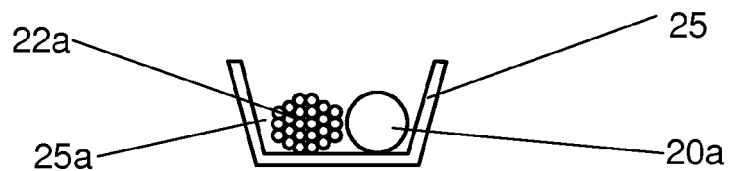
FIG. 4B is a cross-section view taken along the line 4B-4B shown in FIG. 4A.
Figure 4C:
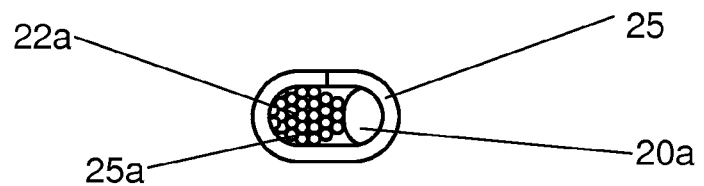
FIG. 4C is a cross-section view showing a state changed from that shown in FIG. 4B.
Figure 5A:
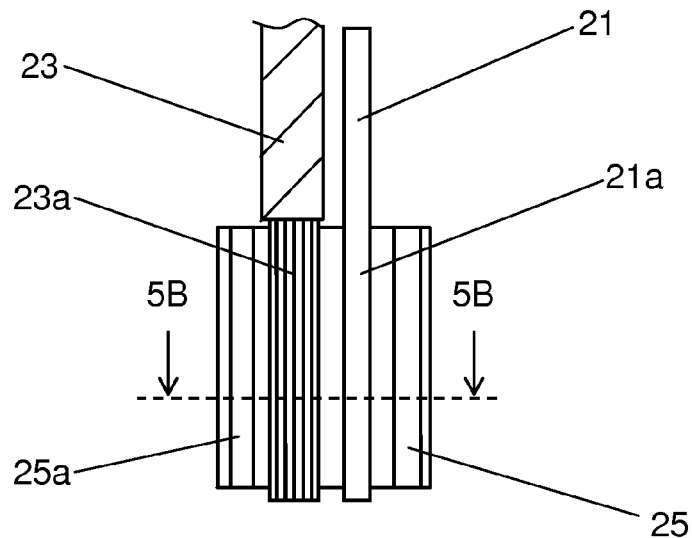
FIG. 5A is a top view illustrating a method for connecting wires of an auxiliary coil of a conventional single-phase induction motor.
Figure 5B:
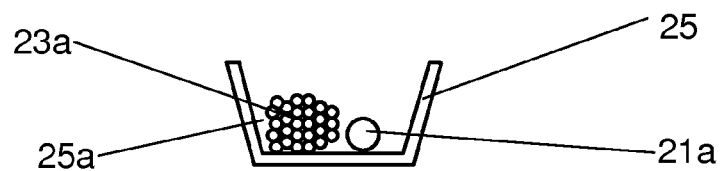
FIG. 5B is a cross-section view taken along the line 5B-5B shown in FIG. 5A.
Figure 5C:
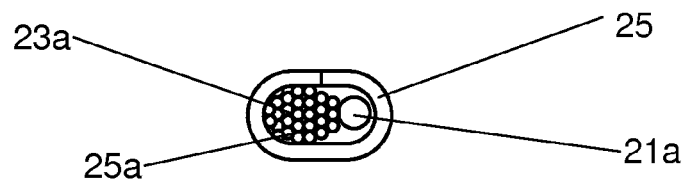
FIG. 5C is a cross-section view showing a state changed from that shown in FIG. 5B.
Figure 6A:
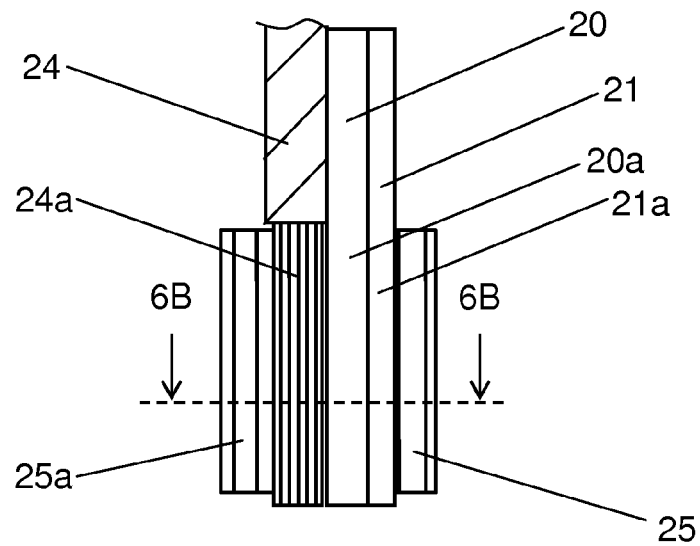
FIG. 6A is a top view illustrating a method for connecting wires of a common coil of a single-phase induction motor.
Figure 6B:
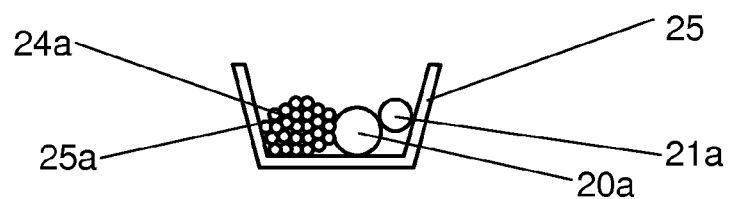
FIG. 6B is a cross-section view taken along the line 6B-6B shown in FIG. 6A.
Figure 6C:
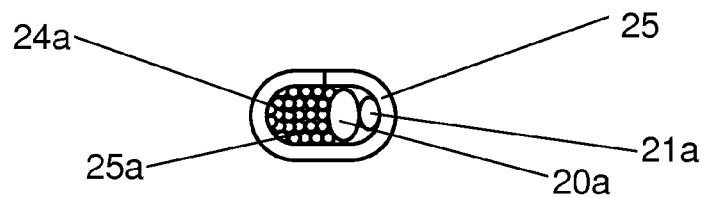
FIG. 6C is a cross-section view showing a state changed from that shown in FIG. 6B.
Figure 7A:
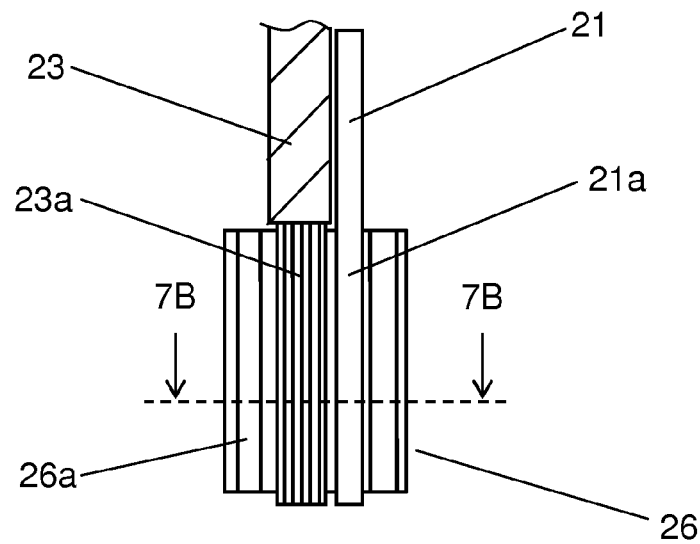
FIG. 7A is a top view illustrating another method for connecting wires of an auxiliary coil of a conventional single-phase induction motor.
Figure 7B:
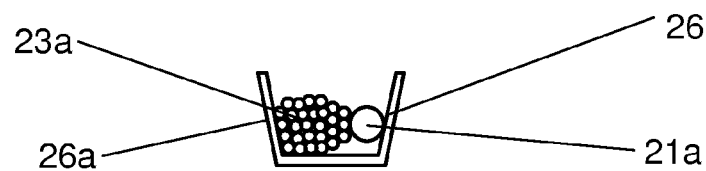
FIG. 7B is a cross-section view taken along the line 7B-7B shown in FIG. 7A.
Figure 7C:
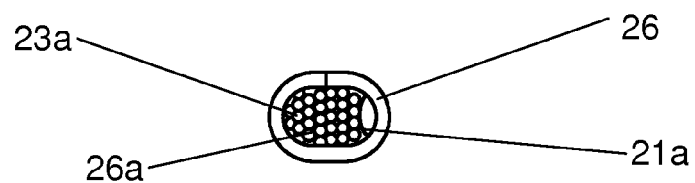
FIG. 7C is a cross-section view showing a state changed from that shown in FIG. 7B.

FIG. 1A is a top view illustrating a method for connecting wires used for a motor in accordance with the first exemplary embodiment of the present invention. FIG. 1B is a cross-section view taken along the line 1B-1B of FIG. 1A. FIG. 1C is a cross-section view showing a state changed from that shown in FIG. 1B. FIG. 2A is a top view illustrating a method for connecting wires used for a motor in accordance with the second exemplary embodiment of the present invention. FIG. 2B is a cross-section view taken along the line 2B-2B of FIG. 2A. FIG. 2C is a cross-section view showing a state changed from that shown in FIG. 2B.

According to the method for connecting wires for a motor of the first exemplary embodiment of the present invention, as shown in FIG. 1A, wire 11 (as a first wire) having folding part 31 is connected to lead 12 (as a first lead) having connecting part 32 by connection terminal 10 having crimping part 30. Lead 12 may be a second wire that will be described later.

After folding part 31 is folded one or more times, folded folding part 31 and connecting part 32 are crimped with each other at crimping part 30.

The structure above will be described in detail with reference to the accompanying drawings.

On the inner side of terminal 10, as shown in FIGS. 1A and 1B, one-time-folded wire 11 and lead 12 are disposed. After that, as shown in FIG. 1C, terminal 10 is bent inwardly such that wire 11 and lead 12 are wrapped in terminal 10, and then terminal 10 is crimped. The crimping on terminal 10 provides wire 11 and lead 12 with a distortion area. When a predetermined amount of distortion is applied to terminal 10, wire 11, and lead 12, wire 11 and lead 12 are electrically and mechanically connected with each other via terminal 10.

There is a case that a wire or lead, which is crimped with a crimping terminal, has a small diameter. In the crimping on a wire and a lead of a small wire diameter, only-one-time folding applied to the folding part may not contribute to sufficient increase in the cross-section area of the wire and the like. That is, due to such an insufficient amount of increase, the cross-section area of the wire and the like will not reach the range necessary for being crimped at the crimping part.

In that case, as shown in FIGS. 2A and 2B, folding part 31 is folded two or more times. This make the cross-section area of folding part 31 increase, so that a predetermined amount of distortion is formed at crimping part 30.

As clear as described above, the wires and the like are crimped with a connection terminal having a crimping part. The connection terminal has a single kind of a size. The folding part is folded one or more times to secure an appropriate cross section area of the wires required at the crimping part when the wires and the like is crimped. When the wires and the like have a cross-section area that fits into a range with which the connection terminal works properly, the crimping part applies a predetermined amount of distortion to the wires and the like. In this way, the wires and the like are connected with each other via the connection terminal. With the structure above, the wires and the like, even if they have a different wire diameter, are properly crimped with a connection terminal of a size, and they are electrically and mechanically connected with each other.

As a result, the method for connecting wires used for a motor of the exemplary embodiment reduces investment in facilities. At the same time, the method of the embodiment addresses management problems in motor production and contributes to reduction of material cost.

The first wire includes at least any one of a copper wire, an aluminum wire, and a copper-clad aluminum wire.

That is, a copper wire, an aluminum wire, and a copper-clad aluminum wire are employed for the first wire. The first wire may be formed of a combination of the copper wire, the aluminum wire, and the copper-clad aluminum wire.

Besides, each of the first wire and the second wire may be a single wire.

The first lead may be a twisted wire.

INDUSTRIAL APPLICABILITY

As described above, according to the method for connecting wires used for a motor of the embodiment of the present invention, wires having different diameters or a wire and a lead having different diameters are able to be crimped with a connection terminal of a single kind of size and are connected with each other. The method for connecting wires used for a motor of the embodiment of the present invention is useful for wire connection in a wide range, for example, it is applicable not only to the wire connection for a single-phase induction motor described above but also to wire connections employed for other motors.

REFERENCE MARKS IN THE DRAWINGS 10, 25, 26 terminal (connection terminal)
11 wire (first wire)
12 lead (first lead or second wire)
20 main coil
20a, 21a wire
21 auxiliary coil
22 main lead
22a, 23a, 24a core wire
23 auxiliary lead
24 common lead
25a, 26a, 30 crimping part
31 folding part
32 connecting part

The invention claimed is:

1. A method for connecting motor wires in which a first wire having an end suitable for folding is connected to a conductive member having a connecting part, the method comprising:
   folding the end of the first wire at least once;
   inserting the end of the first wire and the connecting part of the conductive member into a connection terminal having a crimping part; and
   crimping the crimping part so that the folded end of the first wire and the connecting part of the conductive member substantially fit in a space defined by the crimping part,
   wherein the conductive member has a diameter greater than a diameter of the first wire, and when crimped, the first wire and the conductive member have a predetermined amount of distortion so that the first wire and the conductive member are electrically and mechanically connected, and
   wherein crimping the crimping part is carried out by a crimping machine configured to crimp motor wires having different diameters with connection terminals having a single size.

2. The method for connecting motor wires according to claim 1, wherein the conductive member is a lead.

3. The method for connecting motor wires according to claim 1, wherein the conductive member is a wire.

4. The method for connecting motor wires according to claim 1, wherein the first wire includes at least one of a copper wire, an aluminum wire, and a copper-clad aluminum wire.

5. The method for connecting motor wires according to claim 1, wherein each of the first wire and the conductive member is a single wire.

6. The method for connecting motor wires according to claim 1, wherein the conductive member is a twisted wire.

7. The method for connecting motor wires according to claim 1, wherein the end of the first wire is folded at least twice.

* * * * *